Figure 1:
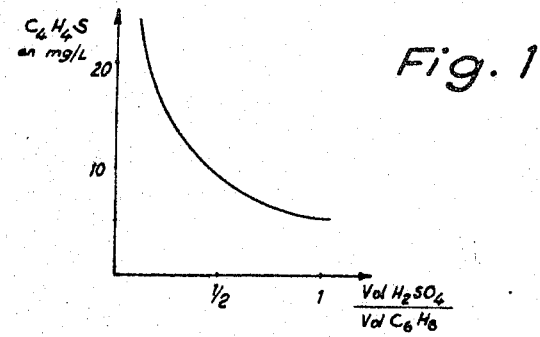

United States Patent Office 3,265,754
Patented August 9, 1966

3,265,754
HYDROCARBON REFINING PROCESS
Marcel Delassus, Mazingarbe, and Jeno Gombar, Bully-les-Mines, France, assignors to Houilleres du Bassin du Nord et du Pas-de-Calais, Douai, France, a French public establishment
Filed Oct. 3, 1961, Ser. No. 142,627
Claims priority, application France, Oct. 5, 1960, 840,335
1 Claim. (Cl. 260—674)

This invention relates to the refining of hydrocarbons of the aromatic series.

Aromatic hydrocarbons such as benzene and toluene as derived from coal processes contain various sulfur compounds which are comparatively easily distilled off. However they also usually contain thiophene and homologs thereof which cannot be separated in a similar way because their boiling points closely approximate that of the hydrocarbons.

It has been known from the early years of the industry that thiophene and its derivatives can be separated by treating the hydrocarbon with concentrated sulfuric acid which reacts therewith to provide sulfonic acids soluble in sulfuric acid and hence easily separable. For many years this type of treatment has been performed batchwise, and has made it possible to provide benzene with less than 100 mg./liter content of thiophene sulfur, with an acceptably low consumption rate of sulfuric acid and benzene losses.

However, the more recent trend is towards continuous rather than batch processes, and attempts have naturally been made to adapt the treatment of benzols with sulfuric acid for continuous operation. However, these attempts have met with unexpected and serious difficulties.

In a continuously operating homogeneous reactor of the type in which the process would have to be carried out, the reactions proceed at a much slower rate than in a discontinuously or batch-operated reactor of the same capacity. It has been attempted to sub-divide the total capacity by using a plurality of cascade mounted reactors of smaller capacity, but the gain in time thus obtained drops off quickly with the number of reactors used, and the over-all result is still unsatisfactory, as can be shown by the following discussion.

Assume it is desired to achieve a prescribed degree of thiophene removal, respectively using a batch reactor of volume V, and in $n$ reactors each of capacity $V/n$, connected in cascade. It is found that the times required to achieve the the said result is as given in the following table, for various values of $n$:

| Batch process | Continuous process | | | |
|---|---|---|---|---|
| | $n=1$ | $n=2$ | $n=3$ | $n=4$ |
| 11.4 min. | 200 min. | 67 min. | 47 min. | 42 min. |

The figures above show that there is no practical advantage in using more than four reactors in a continuous refining process, and even with four reactors the time required for the refining operation is nearly four times longer than in the batch process.

Moreover, there is another serious difficulty. While such a continuous process using cascaded reactors can be used when the benzene end product desired is required to contain less than about 10 mg./l. thiophene sulfur, in many chemical applications where the benzene product is to enter into chemical reaction involving sulfur-sensitive catalysts, the sulfur content just indicated is much too high, and the sulfur content in the benzene should actually be held lower than about 1 mg./l. The conventional continuous refining process which involves a reaction between 2 to 5 parts-by-weight sulfuric acid containing 99–100% $H_2SO_4$ with 100 parts benzene, is quite inapplicable owing to the extremely slow reaction rate.

Moreover, since sulfuric acid and benzene are not miscible, the reaction rate is a function of the benzene-acid interface area, other factors being equal. For this reason it has always been attempted to divide the acid into minute droplets using highly efficient mechanical agitator means. However, no matter how great the dispersion of the sulfuric acid thus produced, the benzene-acid interface area necessarily reaches a limit since it depends on the volume ratio of the respective liquid phases. Where the acid volume is very small as compared to that of the benzene, as will be true where 3–5 parts acid per 100 parts benzene by weight are used, the area is a maximum when the volume ratio of the phase approaches unity.

The curve shown in the accompanying drawing, wherein the remaining thiophene content in the benzene after one minute agitation is plotted as a function of the acid/benzene volume ratio, shows that when the said ratio is changed from 0.25 to 1, the amount of thiophene removed is increased threefold.

The objects of the present invention are greatly to accelerate the continuous thiophene-removal process in aromatic hydrocarbons, and improve the efficiency thereof.

The invention is based on the unexpected finding that a highly effective way of increasing the reaction rate in such a process is to use substantially equal volumes of sulfuric acid and the hydrocarbon such as benzene.

It has been found that when the process is conducted in accordance with the above teaching, not only is the reaction rate of sulfuric acid with thiophene increased, but furthermore the undesirable secondary reaction of sulfuric acid with the benzene, to form benzene-sulfonic acid, which constitutes a source of substantial losses both of acid and benzene in conventional processes, is also accelerated. This means that if benzene were treated with an equal volume of sulfuric acid at the high concentration conventionally used in thiophene removing processes, considerable losses would result.

According to a feature of the invention, it has been discovered that when using equal volumes of acid and benzene, the reaction rate is increased to such an extent that it becomes feasible to use sulfuric acid of much lower concentration than the ranges heretofore used, and still obtain greatly improved results while at the same time minimizing the afore-mentioned losses due to side reactions. Thus, according to the invention benzene may be agitated with an equal volume of sulfuric acid containing 85 to 92% $H_2SO_4$ by volume, and it is found that the degree of thiophene removal thus achieved is just as complete, and the rate of removal just as rapid, as when using 100% sulfuric acid in a weight ratio of 5 parts per 100 parts benzene, while the rate of benzene sulfonation remains low.

It therefore becomes possible according to the invention to provide a continuous thiophene removing process, down to contents as low as 1 mg./l. thiophene sulfur or less, without excessive consumption of acid and benzene, by treating the benzene with an equal volume of sulfuric acid containing from 85 to 92% by weight $H_2SO_4$.

The sulfonation side reaction, while strongly slowed down owing to the dilution of the acid as noted above, is not however completely prevented. The benzene losses and acid consumption rate, while low, may still in some cases be found undesirably high; moreover, since the benzene sulfonation reaction produces one mole water per mole benzene-sulfonic acid formed, the residual sulfuric acid is diluted more and more and the thiophene removal becomes less and less effective.

According to an important feature of the invention, it has been found that if a suitable quantity of benzene-monosulfonic acid is preliminarily added to the sulfuric acid prior to its use in the process of the invention, the benzene sulfonating reaction is practically completely blocked, and the sulfuric acid reacts virtually only with the thiophene. In such case the acid consumption rate will be no higher than the rate corresponding to the thiophene sulfonation reaction, i.e. it is nearly negligible and the benzene losses by sulfonation are practically non-existent.

It should here be noted that reference can be found in the literature to suggested methods of refining cracking oils containing high proportions of aromatic hydrocarbons for making them suitable for use as engine fuels. This prior method, while applied to raw stock differing in character from that used in the invention, does exhibit some apparent similarity with some aspects of the method of the invention in that it involves treatment with low-concentration sulfuric acid and partial recycling. This prior method however not only leads to a very high rate of sulfuric acid consumption, about five or six times higher than in the process of the invention, but it is quite unable to achieve anything approaching the rate of thiophene removal achieved by the invention, which is of the order of 1 part per million, whereas in the prior method the corresponding figure is about 300 parts per million. The reasons for this inferiority of the prior method include the excessive dilution of the sulfuric acid used, which is in the range of 75–85% as against 85–92% according to the invention, and the complete absence of benzene-sulfonic acid addition in the sulfuric acid reagent, which addition as noted above serves according to the invention to block the sulfonation reaction and thereby minimize the rate of sulfuric acid consumption.

Figure 2:
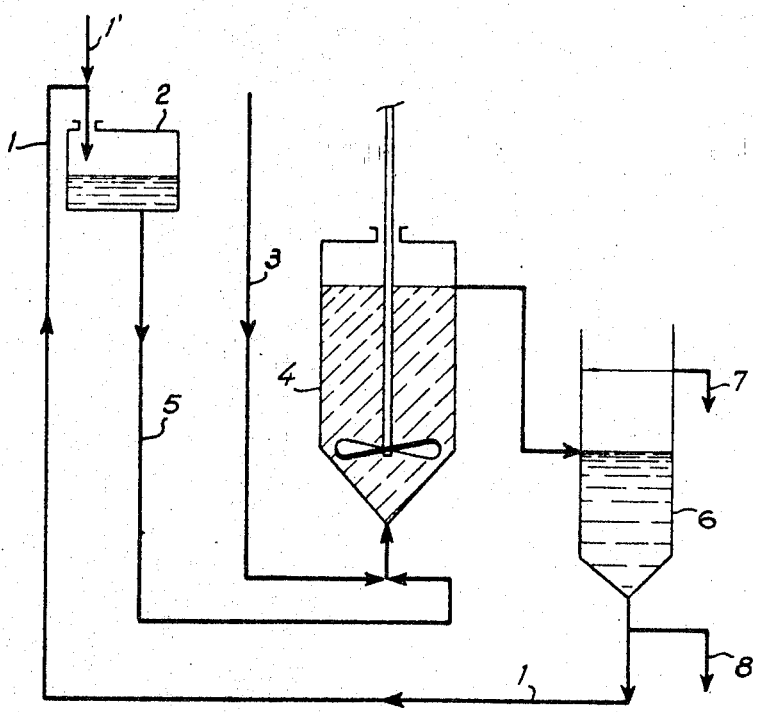

FIG. 2 illustrates a flow sheet of a plant in which the process of the invention can be performed. In the drawing, an acid tank is shown at 2. Conduit 1 serves to feed recycled sulfuric acid and the conduit 1' the make-up sulfuric acid into the tank. A reactor vessel is shown at 4, into which a conduit 3 serves to deliver the hydrocarbon stock, e.g. benzene, to be refined, and sulfuric acid is delivered thereto by way of conduit 5. The refined benzene is passed through a separator 6 and is collected at 7, while the recovered sulfuric acid is recycled through conduit 1, and may when necessary be drained off at 8.

The invention will now be illustrated in a practical example.

*Example*

A conventional continuous refining plant using sulfuric acid produces 600 l./hr. benzene containing 10 mg./l. thiophenic sulfur. This benzene stock is directly and continuous fed into apparatus in accordance with FIG. 2, having a useful capacity of 200 liters and equipped with effective mechanical dispersion means.

At the same time there is fed into the apparatus, at a flowrate of 600 l./hr., a mixture comprising

| | Parts by weight |
|---|---|
| Benzene monosulfonic acid | 30 |
| 90% (by weight) sulfuric acid | 70 |

The mean dwell time of the acid-benzene mixture in the mixer is about ten minutes.

At its exit from the apparatus the benzene and the acid mixture are separated from one another in a continuous sedimentation tank, and the benzene is passed to the conventional finishing treatment including washing with water and soda solution and distillation, while all of the acid is recycled by a pump into the reactor.

In one run the thiophene sulfur content in the input benzene stock was 10 mg./liters, and the content at the outlet from the sedimentation tank was somewhat less than 1 mg./l.

In order to limit the acid content within the closed circuit to about 1% thiophene-sulfonic acid, the acidic mixture is drawn off at a rate of 75 kilograms per 24 hours and the withdrawn acid is replaced with 61 kg. 100% sulfuric acid. Part of this acid is converted into benzene-sulfonic acid consuming about 11 kg. benzene, and enough water is added to adjust the composition of the acidic mixture to the aforesaid value. The theoretical figure for the consumption rate in these conditions is 61 kg./24 hrs. of 100% sulfuric acid, and 11 kg. benzene in refining 12.5 tons benzene. In actual industrial practice, a value that can be reasonably expected for the acid consumption rate is 1% by weight of refined benzene, and a benzene loss rate of 0.2%.

In performing the method industrially it is not necessary that benzene-sulfonic acid be introduced from the very start of the refining process. It is sufficient if sulfuric acid titrating from 95 to 100% by weight $H_2SO_4$ is placed into the circuit, and the benzene-sulfonic acid concentration will establish itself at the desired value.

The quantity of benzene consumed in this initiation stage is negligibly low as compared to the amount that can be treated without any losses after the equilibrium state has become established.

When a hydrocarbon refining process is carried out using all three features of the invention as specified earlier herein, it is seen therefore that the following extremely advantageous results are achieved:

(a) Practically total elimination of thiophene within a time short enough to enable the process to be economically carried out in continuous reactor apparatus;

(b) Reduction of the benzene losses through sulfonation to a near-negligible value; and (c) Extremely low rate of sulfuric acid consumption.

What we claim is:

A continuous process for refining hydrocarbon stock constituted essentially of benzene, and thiophene and its derivatives as contaminating agents, to eliminate said contaminating agents, said process consisting of treating a supply of said stock in the liquid phase with a mixture constituted of sulfuric acid with a titration of 85–92% $H_2SO_4$ and benzene monosulfonic acid to react the sulfuric acid and thiophene and produce separable sulfonation components of the latter, the volumetric ratio of said mixture to the quantity of benzene being approximately 1:1, said mixture containing 65 to 75% by weight of sulfuric acid and 35 to 25% by weight of benzene monosulfonic acid, the ratio of the benzene monosulfonic acid to benzene being such as to block sulfonation of the latter, the consumption of acid being about 1% by weight of refined benzene, the benzene loss rate being about 0.2%, and separating the thiophene reaction products from the benzene to produce which is contaminated by thiophene to an extent of only 1 p.p.m.

References Cited by the Examiner

UNITED STATES PATENTS

| | | | |
|---|---|---|---|
| 1,962,204 | 6/1934 | Morrell | 208—277 |
| 2,114,852 | 4/1938 | McKittrick | 208—224 |
| 2,454,467 | 11/1948 | Love | 260—674 |
| 2,893,954 | 7/1959 | Ten Have et al. | 208—224 |
| 2,948,764 | 8/1960 | Olele et al. | 260—674 |

DELBERT E. GANTZ, *Primary Examiner.*

ALPHONSO D. SULLIVAN, *Examiner.*

D. S. ABRAMS, C. E. SPRESSER, *Assistant Examiners.*